United States Patent
Jayarathne et al.

(10) Patent No.: US 11,965,664 B2
(45) Date of Patent: Apr. 23, 2024

(54) BUILDING HVAC RELATIVE EFFICIENCY MONITORING SYSTEM

(71) Applicant: Johnson Controls Technology Company, Auburn Hills, MI (US)

(72) Inventors: Madhuka Manuranga Jayarathne, Wichita, KS (US); Theresa Thy N. Gillette, Wichita, KS (US); Andrew Michael Boyd, Wichita, KS (US); Thomas D. Chase, Rose Hill, KS (US)

(73) Assignee: Tyco Fire & Security GmbH, Schaffhausen (CH)

( * ) Notice: Subject to any disclaimer, the term of this patent is extended or adjusted under 35 U.S.C. 154(b) by 145 days.

(21) Appl. No.: 16/588,611

(22) Filed: Sep. 30, 2019

(65) Prior Publication Data

US 2020/0292194 A1 Sep. 17, 2020

Related U.S. Application Data

(60) Provisional application No. 62/817,871, filed on Mar. 13, 2019.

(51) Int. Cl.
*F24F 11/47* (2018.01)
*F24F 11/52* (2018.01)
(Continued)

(52) U.S. Cl.
CPC .............. *F24F 11/47* (2018.01); *F24F 11/52* (2018.01); *F24F 11/58* (2018.01); *F24F 11/65* (2018.01);
(Continued)

(58) Field of Classification Search
CPC .. F24F 11/47; F24F 11/52; F24F 11/65; F24F 11/58; F24F 2140/60; F24F 11/63;
(Continued)

(56) References Cited

U.S. PATENT DOCUMENTS 6,385,510 B1 * 5/2002 Hoog ...................... F24F 11/30
700/276
7,302,335 B1 * 11/2007 Xiao ..................... F02D 31/002
60/602

(Continued)

FOREIGN PATENT DOCUMENTS

CA 2957726 A1 3/2016
CA 3043996 A1 2/2018
(Continued)

OTHER PUBLICATIONS

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

(Continued)

*Primary Examiner* — Kenneth M Lo
*Assistant Examiner* — Tameem D Siddiquee
(74) *Attorney, Agent, or Firm* — Fletcher Yoder, P.C.

(57) ABSTRACT

The present disclosure provides systems, apparatuses, and methods for monitoring building efficiency by a heating, ventilation, and air conditioning (HVAC) system. In an aspect, an HVAC unit including a memory and a processor coupled with the memory is disclosed. The processor may be configured to establish a current building efficiency state value of a current run cycle of the HVAC system. The processor may also be configured to determine an building efficiency state deviation value based on a difference between an average building efficiency state value of a set of previous building efficiency state values and the current building efficiency state value. The processor may further be configured to determine whether the building efficiency state deviation value satisfies a building inefficiency threshold. The processor may also be configured to provide an indication including an inefficiency status to a device associated with the HVAC system based on a determination that the (Continued)

current building efficiency state satisfies the building inefficiency threshold.

10 Claims, 5 Drawing Sheets

(51) Int. Cl.
| | |
|---|---|
| *F24F 11/58* | (2018.01) |
| *F24F 11/65* | (2018.01) |
| *G05B 13/02* | (2006.01) |
| *G05B 13/04* | (2006.01) |
| *G05B 15/02* | (2006.01) |
| *G05B 19/042* | (2006.01) |
| *G05B 23/02* | (2006.01) |
| *F24F 140/60* | (2018.01) |

(52) U.S. Cl.
CPC ............ *G05B 13/02* (2013.01); *G05B 13/04* (2013.01); *G05B 15/02* (2013.01); *G05B 19/042* (2013.01); *G05B 23/0235* (2013.01); *F24F 2140/60* (2018.01)

(58) Field of Classification Search
CPC .... G05B 23/0235; G05B 13/04; G05B 13/02; G05B 15/02; G05B 19/042; G05B 2219/2614
See application file for complete search history.

(56) References Cited

U.S. PATENT DOCUMENTS

| | | | | |
|---|---|---|---|---|
| 9,447,985 | B2 | 9/2016 | Johnson | |
| 9,625,169 | B2 | 4/2017 | Sakai et al. | |
| 10,871,756 | B2 | 12/2020 | Johnson et al. | |
| 10,908,578 | B2 | 2/2021 | Johnson et al. | |
| 10,921,768 | B2 | 2/2021 | Johnson et al. | |
| 11,156,978 | B2 | 10/2021 | Johnson et al. | |
| 2012/0054124 | A1* | 3/2012 | Rodrigues | G06Q 50/06 705/412 |
| 2013/0158723 | A1 | 6/2013 | Erickson et al. | |
| 2013/0261808 | A1* | 10/2013 | Besore | F24F 11/62 700/278 |
| 2016/0290668 | A1* | 10/2016 | Taylor | F24F 11/62 |
| 2017/0269653 | A1* | 9/2017 | Shabbir | H05K 7/20727 |
| 2017/0273224 | A1* | 9/2017 | Shabbir | G05B 15/02 |
| 2019/0195525 | A1* | 6/2019 | Varghese | F24F 11/49 |
| 2019/0234638 | A1* | 8/2019 | Song | F24F 11/52 |

FOREIGN PATENT DOCUMENTS

| | | |
|---|---|---|
| CN | 104776635 B | 7/2015 |
| CN | 108561989 A | 9/2018 |
| EP | 3 186 687 A4 | 7/2017 |
| EP | 3 497 377 A1 | 6/2019 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_

(56) References Cited

OTHER PUBLICATIONS

Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

BUILDING HVAC RELATIVE EFFICIENCY MONITORING SYSTEM

CLAIM OF PRIORITY

This application claims the benefit of U.S. Provisional Application Ser. No. 62/817,871, entitled "BUILDING RELATIVE EFFICIENCY DETERMINATIONS" and filed on Mar. 13, 2019, which is expressly incorporated by reference herein in its entirety.

BACKGROUND

The present disclosure relates generally to heating, ventilation, and air conditioning (HVAC) systems, and more particularly, to building relative efficiency monitoring systems.

HVAC systems are becoming increasingly automated and intelligent. Along with this automation comes the desire to control and diagnose HVAC systems from a distance. Controllers for HVAC systems are frequently "smart" devices capable of transmitting various forms of data to a targeted device. This targeted device may be a dedicated computer or a computer identified for receiving the communications from the particular HVAC system. Although a user of the targeted device may be made aware of a basic level of information related to a particular HVAC system, a need exists to have the ability to monitor and control HVAC systems at a more granular level. That is, a need exists for home owner to be informed about efficiency of a home or a building so as to make informed decisions for improvements in building efficiency. Accordingly, improvements are desired in HVAC systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for building relative efficiency determinations used with a HVAC system or any method that uses return and supply system air characteristics.

In an aspect, a controller for monitoring building efficiency of an HVAC system is provided. The controller may include a memory configured to store a set of instructions and at least one processor coupled to the memory and configured to execute the set of instructions. The processor may be configured to establish a current building efficiency state value of a current run cycle of the HVAC system. The processor may also be configured to determine an building efficiency state deviation value based on a difference between an average building efficiency state value of a set of previous building efficiency state values and the current building efficiency state value. The processor may further be configured to determine whether the building efficiency state deviation value satisfies a building inefficiency threshold. The processor may also be configured to provide an indication including an inefficiency status to a device associated with the HVAC system based on a determination that the current building efficiency state satisfies the building inefficiency threshold.

In a further aspect, a method for monitoring building efficiency is provided. The method may include establishing a current building efficiency state value of a current run cycle of the HVAC system. The method may also include determining an building efficiency state deviation value based on a difference between an average set of previous building efficiency state values and the current building efficiency state value. The method may further include determining whether the building efficiency state deviation value satisfies a building inefficiency threshold. The method may also include providing an indication including an inefficiency status to a device associated with the HVAC system based on a determination that the current building efficiency state satisfies the building inefficiency threshold.

In another aspect, a non-transitory computer-readable medium storing computer executable code for monitoring building efficiency by an HVAC unit is provided. The non-transitory computer-readable medium may include code to establish a current building efficiency state value of a current run cycle of the HVAC system. The non-transitory computer-readable medium may also include code to determine an building efficiency state deviation value based on a difference between an average building efficiency state value of a set of previous building efficiency state values and the current building efficiency state value. The non-transitory computer-readable medium may further include code to determine whether the building efficiency state deviation value satisfies a building inefficiency threshold. The non-transitory computer-readable medium may also include code to provide an indication including an inefficiency status to a device associated with the HVAC system based on a determination that the current building efficiency state satisfies the building inefficiency threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

The present aspects generally relate to monitoring building efficiency using an HVAC system. Specifically, as part of controlling the climate of a building, an HVAC system may supply air at a certain temperature during a run cycle through one or more ducts or other pathways within the building. During the course of the run cycle, the HVAC system may also receive returned air at a certain temperature via one or more return ducts or pathways. In some cases, however, the temperature of the returned air may vary greatly from the supplied air, indicating inefficient airflow within the building (e.g., extra use of energy indicating inefficient operation of the building or building having losses). That is, if the temperature of the returned air varies greatly from the supplied air, there may be building environmental factors affecting the return air temperature (e.g., an open window, door, and/or air leaking outside of the building). Such inefficient operation may result in an increase in a number of run cycles of the HVAC system to maintain a defined temperature within the building, causing needless strain on the HVAC system and extra energy costs and inefficient use of resources. As such, it would be desirable to detect such a scenario and inform a user device of the aforementioned detection such that appropriate action may be taken to remedy the inefficient air flow within the building heating and/or cooling energy inefficiencies where they may exist.

As such, the present aspects provides a mechanism by which an HVAC system or any other measurement means that can measure characteristics of air stream and provide feedback to user may monitor and detect building relative inefficiencies. For example, a controller of the HVAC system may determine a reference value for heating or cooling building efficiency using return and supply air temperatures/enthalpy. The HVAC system or any other measurement means that can measure characteristics of an air stream and provide feedback to a user who can also track relative efficiency for multiple data points. The determination may be set to the start of a run cycle and end of a run cycle and average the two (current state). In other aspects, the determination may be a single cycle point or anywhere in between cycle two points. Multiple previous current state points may be stored within the controller and be used to indicate system changes. By comparing a current state point to historical points, an alert can be generated if, for example, a lower return air temperature than usual is detected, thus a lower efficiency (higher loss) can indicate higher in and out traffic or an open point of access to the outside environment. Further, multiple previous current state points may be stored inside the controller and may be used to indicate system changes. By comparing the current state point to historical points, an alert can be generated if, for example, a lower return air temperature than usual is detected. For example, the historical points or stream of data may be used for a predefined time frame such as, but not limited to, hourly, daily weekly, and/or monthly.

Specifically, the present aspects provide an HVAC system or any other measurement means that can measure characteristics of air stream and provide feedback to user that may establish a current building efficiency state value of a current run cycle. The HVAC system may further determine an building efficiency state deviation value based on a difference between an average building efficiency state value of a set of previous building efficiency state values and the current building efficiency state value. The HVAC system may further determine whether the building efficiency state deviation value satisfies a building inefficiency threshold. Additionally, the HVAC system may provide an indication including an inefficiency status to a device associated with the HVAC system based on a determination that the current building efficiency state satisfies the building inefficiency threshold.

Turning now to the figures, example aspects are depicted with reference to one or more components described herein, where components in dashed lines may be optional.

Figure 1:
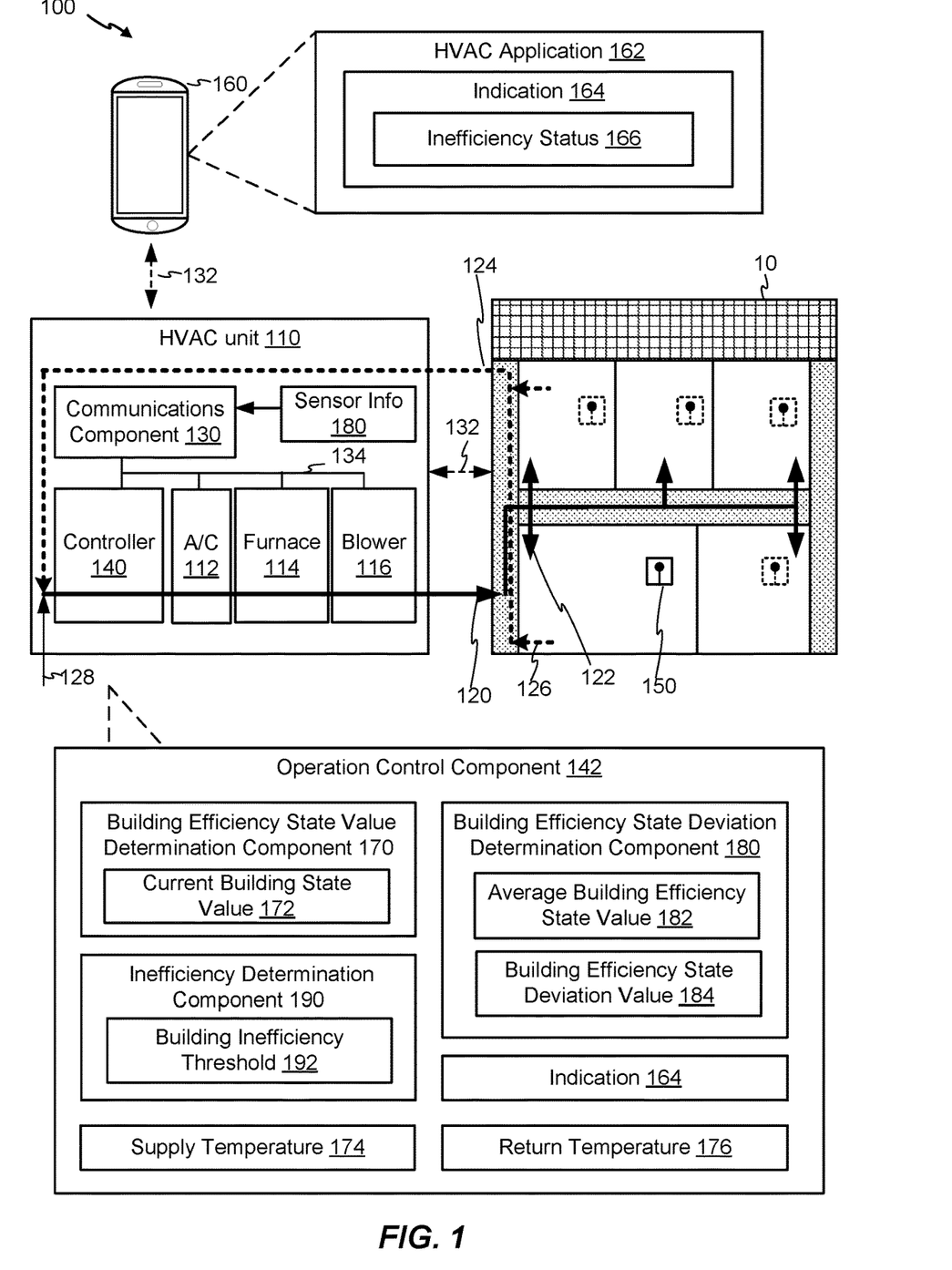
FIG. 1 is a block diagram of an example of components of an HVAC system, according to aspects of the present disclosure.

Referring to FIG. 1, an HVAC system 100 for a building 10 is disclosed. The HVAC system 100 may include an HVAC unit 110 configured to control an ambient condition of the one or more rooms of the building 10 based on information from one or more sensors 150 and/or a remote user device 160. In an example, an ambient condition may be a temperature and/or a humidity level of one or more rooms of the building 10. As shown by FIG. 1, the HVAC unit 110 may be external to the building 10. Alternatively, in some aspects, one or more components (e.g., air conditioning (A/C) unit 112, furnace 114, blower 116, humidifier 118, communications component 130, or controller 140) may be located in different locations including inside the building 10. The building may be a home, office or any other structure that includes an HVAC system for controlling one or more ambient conditions of the structure.

In an aspect, the HVAC system 100 may include supply ducts 120 and return ducts 124 installed within the building 10 and coupled with the HVAC unit 110. The supply ducts 120 may supply air to the building 10, and the return ducts 124 may return air from the building 10. The supply ducts 120 may receive supply air through one or more of intakes 128 that provide outside air to the HVAC system 100 or may recycle return air from the return ducts 124. The supply ducts 120 may output the supply air at one or more of the rooms of the building 10 via one or more supply vents 122. The return ducts 124 may receive return air from the building 10 via the return ducts 124 to balance air within the building 10. The return air may be input into the return ducts 124 via one or more return vents 126.

The HVAC unit 110 may include one or more of an A/C unit 112, a furnace 114, a blower 116, a heat pump, a humidifier, a dehumidifier, or any other component for adjusting an ambient condition of a room of the building 10. The A/C unit 112 may be configured to cool the supply air by passing the supply air through or around one or more cooled pipes (e.g., chiller pipes) having refrigerant flowing through the cooled pipes to lower a temperature of the supply air. The furnace 114 may be configured to warm the supply air by passing the supply air through or around one or more warmed pipes (e.g., heating coils) to raise a temperature of the supply air. The blower 116 may be configured to blow the supply air through the supply ducts 120 to the building 10 and pull the return air from the building 10. The humidifier 118 may be configured to add moisture to the supply air. The dehumidifier may be configured to reduce moisture in the supply air.

The HVAC unit 110 may also include a communications component 130 configured to communicate with the one or more sensors 150 and/or the remote user device 160. In an aspect, the communications component 130 may communicate with the one or more sensors 150 and/or the remote user device 160 via one or more communications links 132. In an example, the communications component 130 may include one or more antennas, processors, modems, radio frequency components, and/or circuitry for communicating with the sensor 150 and/or the remote user device 160. The one or more communications links 132 may be one or more of a wired communication link or a wireless communication link.

The HVAC system 100 may also include the one or more sensors 150 located within one or more rooms of the building 10 and/or within or near the supply vents 122. One or more sensors 150 may be configured to detect an ambient condition such as a temperature and/or a humidity level of the room where the sensor 150 is located. Each of the sensors 150 may provide sensor information 180 to the HVAC unit 110. Examples of a sensor 150 may include a temperature sensor, a humidity sensor, or any sensor configured to detect an ambient condition of one or more rooms of the building 10.

The HVAC system 100 may also include the remote user device 160 configured to communicate with the HVAC unit 110. The remote user device 160 may include an HVAC application 162 configured to display, adjust, and store information including settings for one or more rooms of the building 10. For example, the HVAC application 162 may receive an indication 164 including an inefficiency status 166 from the HVAC unit 110 and display the indication 164 on the remote user device 160. In an example, the information may include heating/cooling settings indicating one or more temperatures (e.g., minimum and/or maximum room temperatures) for one or more rooms of the building and/or humidity settings indicating a humidity level for one or more rooms of the building 10. The remote user device 160 may provide the information to the HVAC unit 110. Examples of a remote user device 160 may include a cellular phone, a smart phone, a personal digital assistant (PDA), a wireless modem, a wireless communication device, a handheld device, a tablet computer, a laptop computer, a cordless phone, a smart watch, an entertainment device, an Internet of Things (IoT) device, or any device capable of communicating with the HVAC unit 100. A smart speaker may include, for example, an Echo® device available from Amazon, Inc. of Seattle, Washington, a Google Home® device available from Google, Inc. of Mountain View, California, or other similar devices. The HVAC application 182 may include a voice interface that response to voice commands The HVAC unit 110 may also include a controller 140 configured to control the A/C unit 112, the furnace 114, the blower 116, and the humidifier 118, for example, based on the sensor information 180 received from the sensor 150 and/or information received from the remote user device 160. The controller 140 may communicate with the communications component 130, the A/C unit 112, the furnace 114, the blower 116, and/or the humidifier/dehumidifier 118 via a communications bus 134. The controller 140 may include logic to operate the A/C unit 112, the furnace 114, the blower 116, and the humidifier/dehumidifier 118, for example, based on the sensor information 180 and/or information received from the remote user device 160. The operation of the components of the HVAC unit 110 may include one or more of an initiation time, a stop time, a run time, a power state, speed level, a heating/cooling level, and/or any other operational state of one or more of these components of the HVAC unit 110.

In an aspect, the controller 140 may include an operation control component 142 to perform the logic of the controller 140. The operation control component 142 may include an building efficiency state value determination component 170 configured to determine a current building efficiency value 172 based at least on a difference between supply temperature 174 and a return temperature 176. The operation control component 142 may further include an building efficiency state deviation determination component 180, which may be configured to determine an building efficiency state deviation value 184 based on a difference between an average building efficiency state value 182 of a set of previous building efficiency state values and the current building efficiency state value 172. In other words, the building efficiency state deviation value 184 corresponds to a difference between the average building efficiency state value 182 representing a historical building efficiency state value of the HVAC unit 110 and the current building efficiency value 172. The operation control component 142 may further include an inefficiency determination component 190, which may be configured to determine whether the building efficiency state deviation value 184 satisfies a building inefficiency threshold 192 (e.g., indicative of temperature or other air properties). In some aspects, the building inefficiency threshold 192 represents a minimum efficiency value by which the current building efficiency value 172 may deviate from the average building efficiency state value 182 indicating a high loss of energy supplied through supply air stream within one or more run cycles, and thereby triggering a transmission of the indication 164 including an inefficiency status 166 to the remote user device 160.

Figure 2:
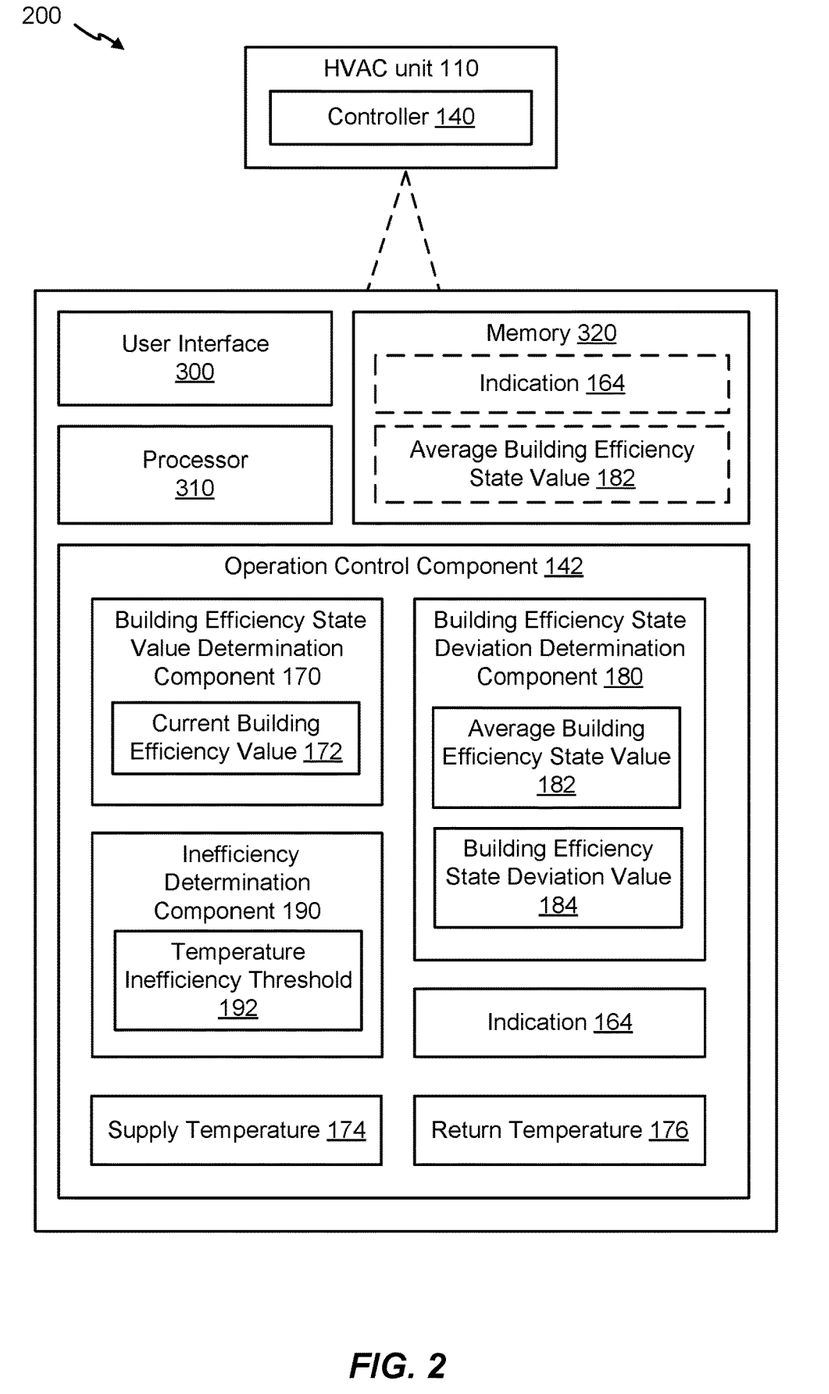
FIG. 2 is a flowchart of an example method of monitoring building efficiency of the HVAC system by the HVAC unit of FIG. 1, according to aspects of the present disclosure.

Referring to FIG. 2, the HVAC unit 110 and the controller 140 may include a variety of components, some of which have already been described herein. As shown, the controller 140 may also include a user interface 200, a processor 210, and a memory 220 which operate in conjunction to perform one or more functions described herein related to monitoring building efficiency. The user interface 200 may operate to receive information from the processor 210 and communicate the information to a user. In an example, the user interface 200 may include one or more lights, speakers, or displays to communicate the information to the user. The processor 210 may be one or more processors configured to control the HVAC unit 110 and perform one or more functions described herein.

The memory 220 may be configured to store data (e.g., indication 164, average HVAC state value 182) used herein and/or functions and operations performed by the processor 210 and/or the operation control component 142. The memory 220 may include any type of computer-readable medium usable by a computer or at least one processor 220, such as random access memory (RAM), read only memory (ROM), tapes, magnetic discs, optical discs, volatile memory, non-volatile memory, and any combination thereof. In an aspect, the memory 220 may be a non-transitory computer-readable storage medium that stores one or more computer-executable codes defining the operation control component 142 and/or one or more of subcomponents of the operation control component 142, and/or data associated therewith, when HVAC unit 110 is operating the processor 310 to execute the operation control component 142 and/or one or more of subcomponents.

Figure 3:
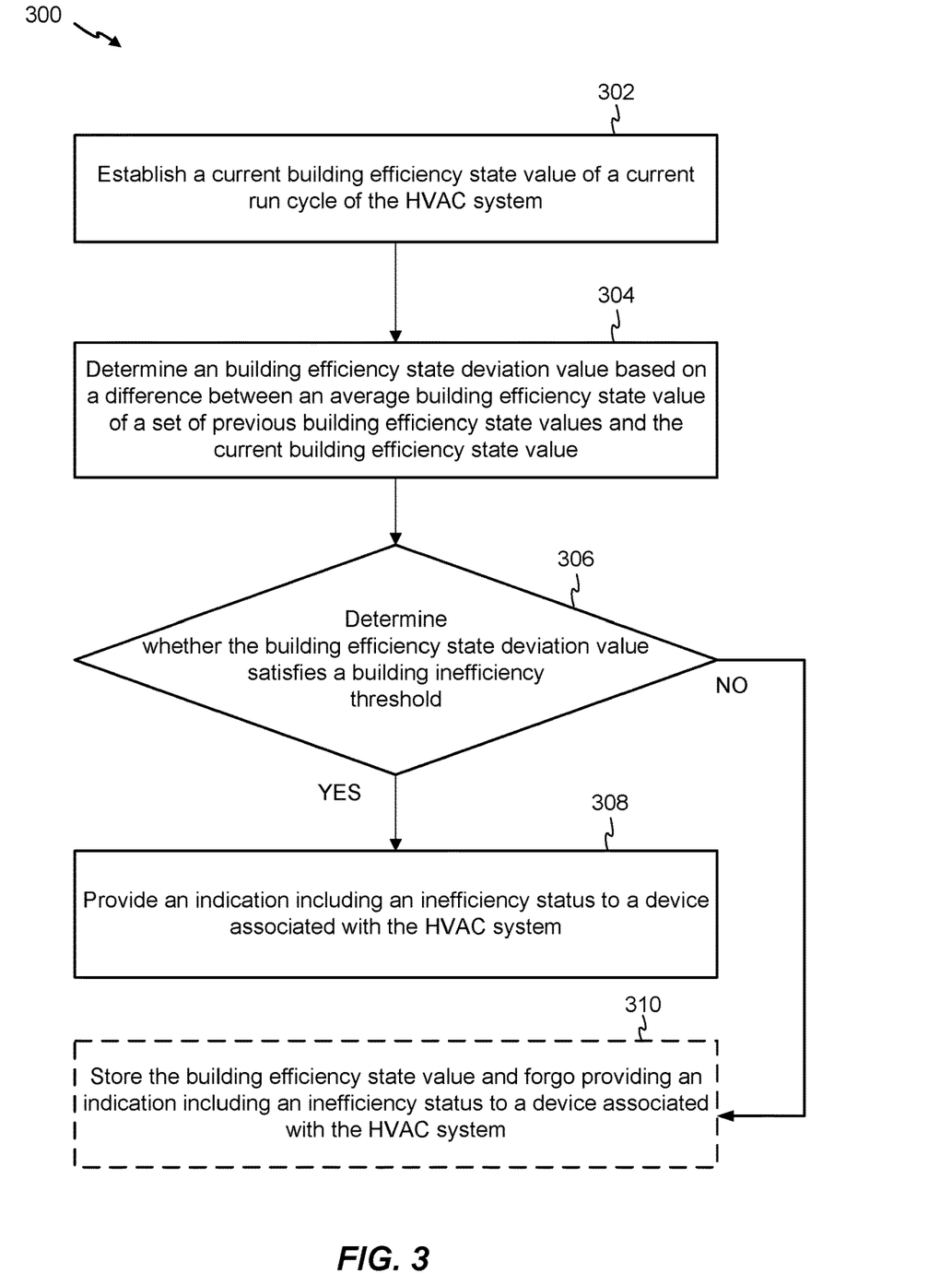
FIG. 3 is a block diagram of an example of components of the HVAC unit of FIG. 1, according to aspects of the present disclosure.

Referring to FIG. 3, an example of a method 200 for monitoring building efficiency (e.g., building 10) associated with the HVAC unit 110 is provided. The method 300 may implement the functionality described herein with reference to FIG. 1 and may be performed by one or more components of the HVAC unit 110 as described herein with reference to FIGS. 1 and 2.

At 302, the method 300 may include establish a current building efficiency state value of a current run cycle of the HVAC system. For example, one or more components (e.g., processor 310, memory 320, operation control component 142) of the HVAC unit 110 may establish or determine a current building efficiency state value 172 of a current run cycle of the HVAC unit 110. In some aspects, the current building efficiency state value represents an building efficiency according to a supply temperature 174 and a return temperature 176 (or supply and return enthalpy measurements).

In some aspects, the current building efficiency state value 172 may be based at least in part on a difference between a supply temperature value 174 and a return temperature value 176 of the current run cycle of the HVAC unit 110. Further, in some aspects, the current building efficiency state value 172 may be further based on a constant value (e.g., 1.08) and an airflow value of the HVAC unit 110. Additionally, in some aspects, the current building efficiency state value 172 may be determined according to a product of the constant value and the difference between the supply temperature value 174 and the return temperature value 176 multiplied by the airflow value.

In some aspects, the current HVAC state value 172 may be based at least on an efficiency value of the HVAC unit 110, a returning air flow, and a cubic volume of air flow.

At 304, the method 300 may include determine an building efficiency state deviation value based on a difference between an average building efficiency state value of a set of previous building efficiency state values and the current building efficiency state value. For example, one or more components (e.g., processor 310, memory 320, operation control component 142) of the HVAC unit 110 may determine an building efficiency state deviation value 184 based on a difference between an average building efficiency state value 182 of a set of previous building efficiency state values and the current building efficiency state value 172.

In some aspects, the average building efficiency state value 182 of the set of previous building efficiency state values may correspond to a running average of a previous number of building efficiency state values each associated with distinct run cycles of the HVAC unit 110. In some aspects, the average building efficiency state value 182 of the set of previous HVAC state values may correspond to a previous number of building efficiency state values over a predetermined period of time.

At 306, the method 300 may include determine whether the building efficiency state deviation value satisfies a building inefficiency threshold. For example, one or more components (e.g., processor 310, memory 320, operation control component 142) of the HVAC unit 110 may determine whether the building efficiency state deviation value 184 satisfies a building inefficiency threshold 192.

In some aspects, the building inefficiency threshold 192 may correspond to a minimum deviation amount from the average building efficiency state value 182 indicating an inefficient building temperature state.

At 308, the method 300 may include provide an indication including an inefficiency status to a device associated with the HVAC system based on a determination that the current building efficiency state satisfies the temperature inefficiency threshold. For example, one or more components (e.g., processor 310, memory 320, operation control component 142) of the HVAC unit 110 may provide an indication 164 including an inefficiency status 166 to a device (e.g., remote user device 160) associated with the HVAC unit 110 based on a determination that the current building efficiency state value 172 satisfies the temperature inefficiency threshold 192. In some aspects, the indication 164 may correspond to an email, text message, an indication on an HVAC application on a mobile device, and/or a light on the controller At 310, the method 300 may optionally include store the building efficiency state value and forgo providing an indication including an inefficiency status to a device associated with the HVAC system. For example, one or more components (e.g., processor 310, memory 320, operation control component 142) of the HVAC unit 110 may store the current building efficiency state value 172 (e.g., in memory 32) and forgo providing the indication 164 including an inefficiency status 166 to a device associated with the HVAC unit 110.

Although not shown, the method 300 may further adjust the average building efficiency state value 182 based on the current building efficiency state value 172. That is, the operational control component 142 may update the average building efficiency state value 182 to incorporate the current building efficiency state value 172.

In some aspects, although not shown, to determine the current building efficiency state value, the method 300 may receive a supply temperature value and a return temperature value at a first time of the current run cycle from the HVAC unit 110, determine a first temperature difference value between the supply temperature value and the return temperature value of the first time, receive a supply temperature value and a return temperature value at a second time of the current run cycle from the HVAC unit 110, determine a second temperature difference value between the supply temperature value and the return temperature value of the second time, where the current building efficiency state value 172 corresponds to an average of the first temperature difference value and the second temperature difference value.

Figure 4:
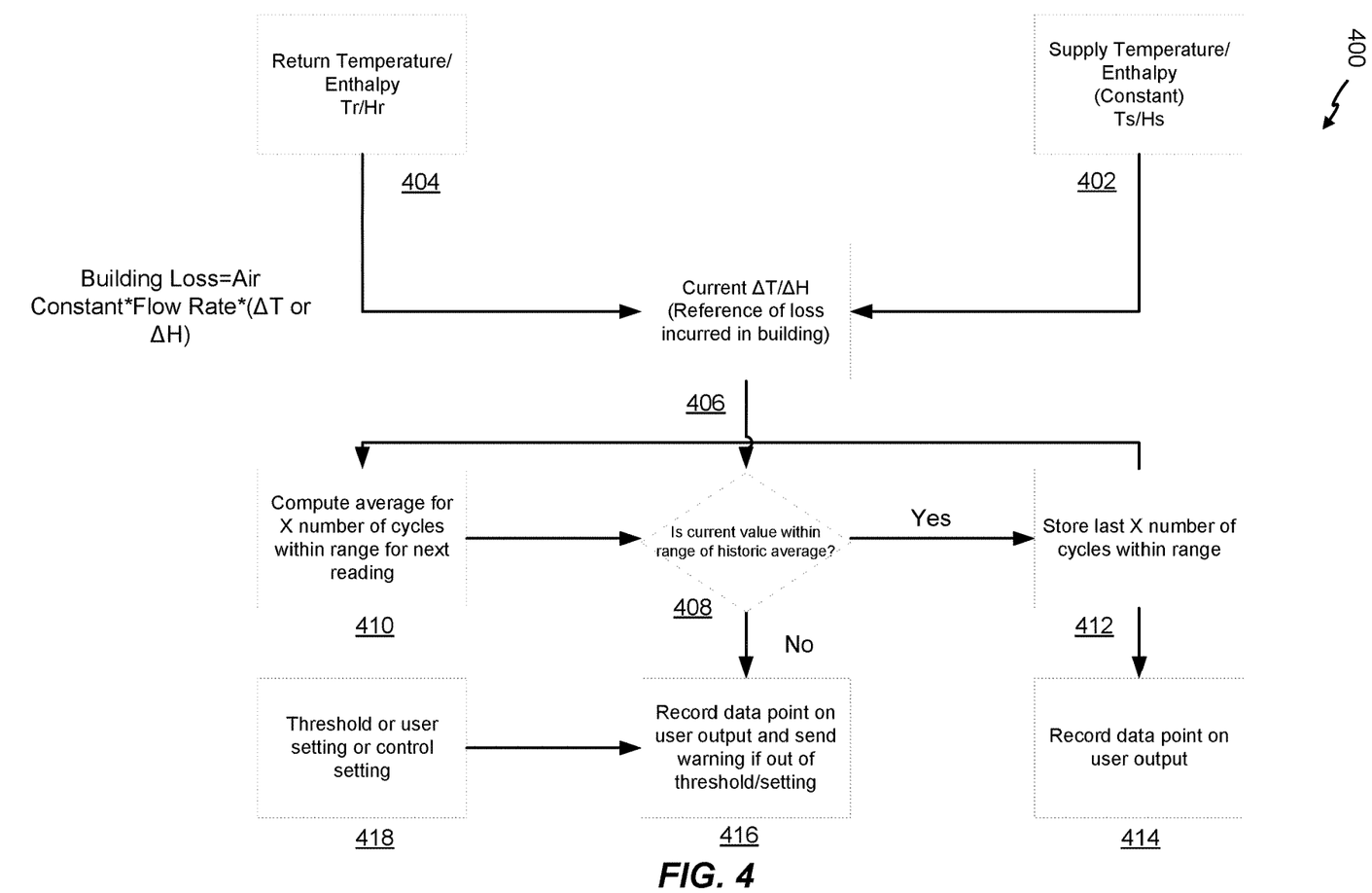
FIG. 4 is a conceptual diagram of an example flow for monitoring building efficiency of the HVAC system by the mobile device of FIG. 1, according to aspects of the present disclosure.

Referring to FIG. 4, a conceptual diagram of a flow 400 for monitoring building efficiency associated with the HVAC unit 110. The flow 400 may be implemented by one or more components of the HVAC unit 110 including the operation control component 142. At 402, a supply temperature and/or enthalpy (constant) "Ts/Hs" may be detected by the one or more sensors 150 at the supply ducts 120. Further, at 404, a return temperature and/or enthalpy "Tr/Hr" may be detected by the one or more sensors 150 at the return ducts 124. At 406, a current difference of loss incurred in the building may be determined. Specifically, a difference between the detected supply temperature and the return temperature may be determined. In some aspects, the building loss (efficiency value) may be determined based on or otherwise equal to an air constant multiplied by a flow rate and a difference between temperatures or heat/cooling (e.g., Building Loss=Air Constant*Flow Rate*($\Delta T$ or $\Delta H$)). At 408, a determination may be made as to whether the current value (determined in 406) is within range of historic average. At 410, an average for the X number of run cycles within range for a next reading is computed. At 412, a last X number of run cycles within range may be stored. If the current value is not within the historic range (as determined at 408), at 416, the data associated with the current difference of loss incurred in the building may be recorded and a warning indication issued to a device associated with the HVAC unit 110. If not, at 414, the data associated with the current difference of loss incurred in the building may be recorded at the HVAC unit 110 without transmission of the warning indication. Further, at 418, a threshold or user setting or control setting may be determined.

Figure 5:
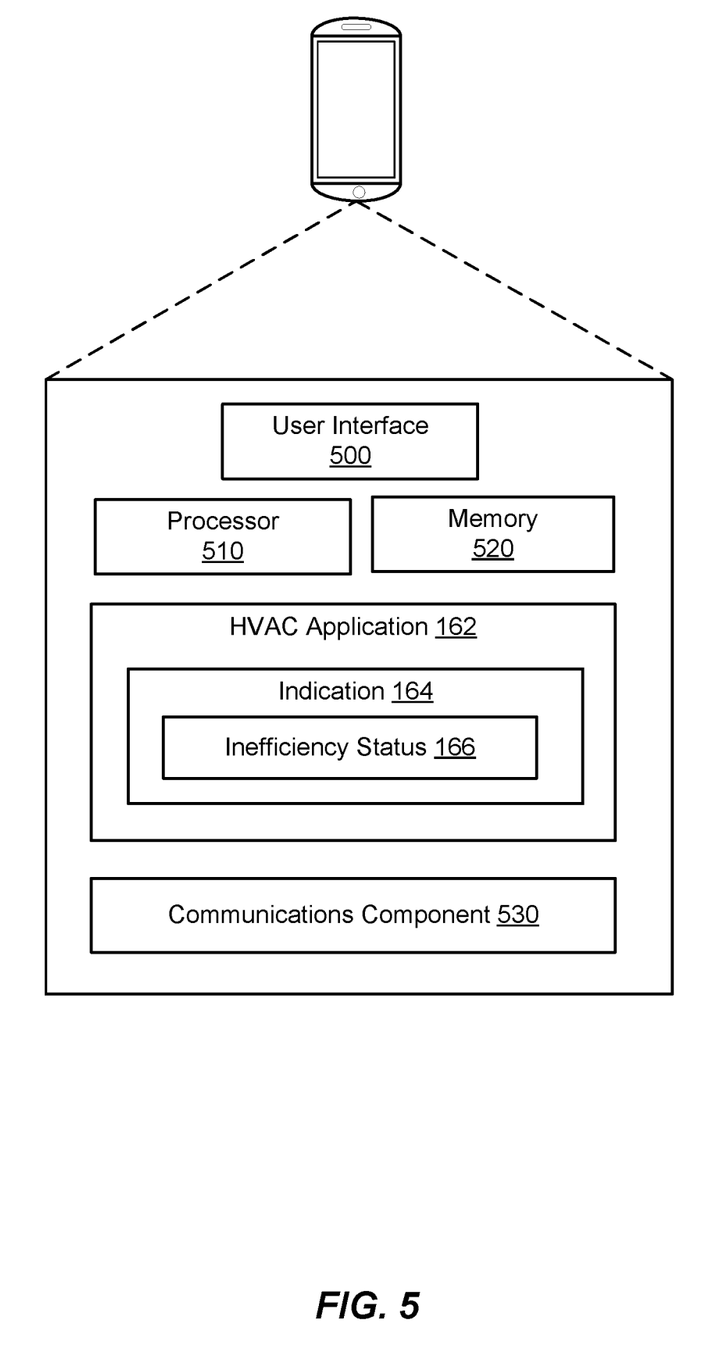
FIG. 5 is a block diagram of an example of components of the remote user device of FIG. 1, according to aspects of the present disclosure.

Referring to FIG. 5, the remote user device 160 may include a variety of components, some of which have already been described herein. As shown, the remote user device 160 may also include a user interface 500, a processor 510, a memory 520, and a communications component 530 which operate in conjunction to perform one or more functions described herein related to the building efficiency monitoring.

The user interface 500, the processor 510, the memory 520, and the communications component 530 may be the same or similar to the corresponding components of the HVAC unit 110, as described herein, but may be configured or programmed to perform mobile device operations as opposed to HVAC unit operations.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A controller for monitoring building efficiency of a heating, ventilation, and air conditioning (HVAC) system, comprising:
a memory configured to store a set of instructions; and
at least one processor coupled to the memory and configured to execute the set of instructions, wherein the at least one processor is further configured to:
establish a current building efficiency state value of a current run cycle of the HVAC system, wherein the current building efficiency state value is based on a first building efficiency reference value corresponding to a beginning of the current run cycle and a second building efficiency reference value corresponding to an end of the current run cycle, the first building efficiency reference value is based at least in part on a first temperature difference value between a first supply temperature value and a first return temperature value at the beginning of the current run cycle of the HVAC system, the second building efficiency reference value is based at least in part on a second temperature difference value between a second supply temperature value and a second return temperature value at the end of the current run cycle of the HVAC system, the current building efficiency state value is further based on an average of the first temperature difference value and the second temperature difference value and based on a constant value and an airflow value of the HVAC system, and the current building efficiency state value is determined according to a product of the constant value and the average of the first temperature difference value and the second temperature difference value multiplied by the airflow value;
determine a building efficiency state deviation value based on a difference between an average building efficiency state value of a set of previous building efficiency state values and the current building efficiency state value, wherein the average building efficiency state value of the set of previous building efficiency state values corresponds to a running average of a previous number of building efficiency state values, wherein each previous building efficiency state value of the set of previous building efficiency state values is associated with a respective, distinct run cycle;
determine whether the building efficiency state deviation value satisfies a building inefficiency threshold; and
provide an indication including an inefficiency status to a device associated with the HVAC system based on a determination that the current building efficiency state satisfies the building inefficiency threshold.

2. The controller of claim 1, wherein the building inefficiency threshold corresponds to a minimum deviation amount from the average building efficiency state value indicating an inefficient building temperature state.

3. The controller of claim 1, wherein the at least one processor is further configured to adjust the average building efficiency state value based on the current building efficiency state value.

4. A method of monitoring building efficiency, comprising:
establishing a current building efficiency state value of a current run cycle of a heating, ventilation, and air conditioning (HVAC) system based on a first building efficiency reference value corresponding to a start of the current run cycle and a second building efficiency reference value corresponding to an end of the current run cycle, wherein the first building efficiency reference value is based at least in part on a first temperature difference value between a first supply temperature value and a first return temperature value at the start of the current run cycle of the HVAC system, and wherein the second building efficiency reference value is based at least in part on a second temperature difference value between a second supply temperature value and a second return temperature value at the end of the current run cycle of the HVAC system, the current building efficiency state value is further based on an average of the first temperature difference value and the second temperature difference value and based on a constant value and an airflow value of the HVAC system, and the current building efficiency state value is determined according to a product of the constant value and the average of the first temperature difference value and the second temperature difference value multiplied by the airflow value;

determining a building efficiency state deviation value based on a difference between an average building efficiency state value of a set of previous building efficiency state values and the current building efficiency state value;

comparing the building efficiency state deviation value to a building inefficiency threshold value; and providing an indication including an inefficiency status to a device associated with the HVAC system based on a determination that the building efficiency state deviation value exceeds the building inefficiency threshold value.

5. The method of claim 4, wherein the current building efficiency state value is based at least on an efficiency value of the HVAC system, a returning air flow, and a cubic volume of air flow.

6. The method of claim 4, wherein the average building efficiency state value of the set of previous building efficiency state values corresponds to a running average of a previous number of building efficiency state values each associated with distinct run cycles.

7. The method of claim 4, wherein the average building efficiency state value of the set of previous building efficiency state values corresponds to a previous number of building efficiency state values over a predetermined period of time.

8. The method of claim 4, wherein the building inefficiency threshold value corresponds to a minimum deviation amount from the average building efficiency state value indicating an inefficient building temperature state.

9. The method of claim 4, comprising adjusting the average building efficiency state value based on the current building efficiency state value.

10. The controller of claim 1, wherein the current building efficiency state value is based on an average of the first building efficiency reference value and the second building efficiency reference value.

* * * * *